United States Patent
Kwon et al.

(10) Patent No.: US 9,625,010 B2
(45) Date of Patent: Apr. 18, 2017

(54) PLANETARY GEAR TRAIN OF AUTOMATIC TRANSMISSION FOR VEHICLE

(71) Applicant: Hyundai Motor Company, Seoul (KR)

(72) Inventors: Hyun Sik Kwon, Seoul (KR); Jae Chang Kook, Hwaseong-si (KR); Dong Hwan Hwang, Seoul (KR); Seong Wook Hwang, Gunpo-si (KR); Chang Wook Lee, Suwon-si (KR); Seongwook Ji, Ansan-si (KR); Wonmin Cho, Hwaseong-si (KR); JongSool Park, Hwaseong-si (KR); KyeongHun Lee, Seoul (KR); Jong Soo Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/949,633

(22) Filed: Nov. 23, 2015

(65) Prior Publication Data

US 2017/0074370 A1    Mar. 16, 2017

(30) Foreign Application Priority Data

Sep. 14, 2015  (KR) ................. 10-2015-0129856

(51) Int. Cl.
*F16H 3/66*    (2006.01)

(52) U.S. Cl.
CPC ....... *F16H 3/66* (2013.01); *F16H 2200/0065* (2013.01); *F16H 2200/2012* (2013.01); *F16H 2200/2046* (2013.01)

(58) Field of Classification Search
CPC ............... F16H 3/66; F16H 2200/2046; F16H 2200/2012; F16H 2200/0065
USPC ........................................ 475/275–292, 330
See application file for complete search history.

(56) References Cited

U.S. PATENT DOCUMENTS

| 2016/0123432 A1* | 5/2016 | Ji ............................... F16H 3/66 475/275 |
| 2016/0169337 A1* | 6/2016 | Ji ............................... F16H 3/66 475/275 |
| 2016/0169345 A1* | 6/2016 | Cho ........................... F16H 3/66 475/277 |

FOREIGN PATENT DOCUMENTS

| JP | 2013-190048 A | 9/2013 |
| KR | 10-2013-0000171 A | 1/2013 |

* cited by examiner

*Primary Examiner* — Roger Pang
(74) *Attorney, Agent, or Firm* — Morgan, Lewis & Bockius LLP

(57) ABSTRACT

A planetary gear train of an automatic transmission for a vehicle may include an input shaft receiving torque of an engine, an output shaft configured to output changed torque of the engine, a first planetary gear set including first, second, and third rotation elements, a second planetary gear set including fourth, fifth, and sixth rotation elements, a third planetary gear set including seventh, eighth, and ninth rotation elements, and a fourth planetary gear set including tenth, eleventh, and twelfth rotation elements.

8 Claims, 2 Drawing Sheets

FIG. 2

|  | Control element ||||||  Gear ratio | Step ratio | Gear ratio span |
|  | C1 | C2 | C3 | C4 | B1 | B2 |  |  |  |
| --- | --- | --- | --- | --- | --- | --- | --- | --- | --- |
| D1 | ● | ● |  |  | ● |  | 4.503 |  | 8.747 |
| D2 |  | ● | ● |  | ● |  | 2.700 | 1.668 | |
| D3 |  |  | ● | ● | ● |  | 1.763 | 1.531 | |
| D4 | ● |  |  | ● | ● |  | 1.326 | 1.330 | |
| D5 | ● |  | ● | ● |  |  | 1.000 | 1.326 | |
| D6 | ● |  |  | ● |  | ● | 0.818 | 1.223 | |
| D7 |  |  | ● | ● |  | ● | 0.690 | 1.186 | |
| D8 |  | ● |  | ● |  | ● | 0.589 | 1.171 | |
| D9 |  | ● | ● |  |  | ● | 0.515 | 1.144 | |
| REV | ● |  |  |  | ● | ● | -3.830 |  |  |

PLANETARY GEAR TRAIN OF AUTOMATIC TRANSMISSION FOR VEHICLE

CROSS-REFERENCE TO RELATED APPLICATION

The present application claims priority to Korean Patent Application No. 10-2015-0129856, filed Sep. 14, 2015, the entire contents of which is incorporated herein for all purposes by this reference.

BACKGROUND OF THE INVENTION

Field of the Invention

The present invention relates to an automatic transmission for a vehicle. More particularly, the present invention relates to a planetary gear train of an automatic transmission for a vehicle that improves power delivery performance and reduces fuel consumption by achieving nine forward speed stages and widening gear ratio span using a minimum number of constituent elements and securing linearity of step ratios.

Description of Related Art

In recent years, a rise in oil price caused unlimited competition for enhancing fuel efficiency.

As a result, research is being conducted on engines in terms of reducing weight and improving fuel efficiency by down-sizing, and research is also being conducted for simultaneously securing operability and fuel efficiency competitiveness by implementing an automatic transmission with multiple speed stages.

However, in the automatic transmission, as the number of speed stages increase, the number of internal components increase, and as a result, the automatic transmission may be difficult to mount, the manufacturing cost and weight may be increased, and power transmission efficiency may be deteriorated.

Accordingly, development of a planetary gear train which may bring about maximum efficiency with a small number of components may be important in order to increase a fuel efficiency enhancement effect through the multiple speed stages.

In this aspect, in recent years, 8-speed automatic transmissions tend to be implemented and the research and development of a planetary gear train capable of implementing more speed stages has also been actively conducted.

However, since a conventional 8-speed automatic transmission has gear ratio span of 6.5-7.5, improvement of fuel economy may not be great.

In addition, if 8-speed automatic transmission has gear ratio span larger than 9.0, it is hard to secure linearity of step ratios. Therefore, driving efficiency of an engine and drivability of a vehicle may be deteriorated, and thus, development of high efficiency automatic transmissions which achieve at least nine forward speed stages is necessary.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a planetary gear train of an automatic transmission for a vehicle having advantages of improving power delivery performance and fuel economy by achieving nine forward speed stages and one reverse speed stage and widening gear ratio span and of securing linearity of step ratios.

According to various aspects of the present invention, a planetary gear train of an automatic transmission for a vehicle may include an input shaft receiving torque of an engine, an output shaft configured to output changed torque of the engine, a first planetary gear set including first, second, and third rotation elements, a second planetary gear set including fourth, fifth, and sixth rotation elements, a third planetary gear set including seventh, eighth, and ninth rotation elements, and a fourth planetary gear set including tenth, eleventh, and twelfth rotation elements, in which the input shaft may be directly connected to the second rotation element, the output shaft may be directly connected to the eleventh rotation element, the first rotation element may be directly connected to the seventh rotation element, the sixth rotation element may be directly connected to the tenth rotation element, the fifth rotation element may be directly connected to the eighth rotation element, the ninth rotation element may be directly connected to the eleventh rotation element, the first rotation element and the seventh rotation element may be selectively connected respectively to the third rotation element and the fourth rotation element, the fifth rotation element and the eighth rotation element may be selectively connected to the third rotation element, the third rotation element may be selectively connected to the twelfth rotation element, the sixth rotation element and the tenth rotation element may be selectively connected to a transmission housing, and the fourth rotation element may be selectively connected to the transmission housing.

The first, second, and third rotation elements may be a first sun gear, a first planet carrier, and a first ring gear, the fourth, fifth, and sixth rotation elements are a second sun gear, a second planet carrier, and a second ring gear, the seventh, eighth, and ninth rotation elements may be a third sun gear, a third planet carrier, and a third ring gear, and the tenth, eleventh, and twelfth rotation elements may be a fourth sun gear, a fourth planet carrier, and a fourth ring gear.

Each of the first, second, third, and fourth planetary gear sets may be a single pinion planetary gear set.

The planetary gear train may further include a first clutch selectively connecting the first rotation element and the seventh rotation element to the third rotation element, a second clutch selectively connecting the first rotation element and the seventh rotation element to the fourth rotation element, a third clutch selectively connecting the fifth rotation element and the eighth rotation element to the third rotation element, a fourth clutch selectively connecting the third rotation element to the twelfth rotation element, a first brake selectively connecting the sixth rotation element and the tenth rotation element to the transmission housing, and a second brake selectively connecting the fourth rotation element to the transmission housing.

According to various aspects of the present invention, a planetary gear train of an automatic transmission for a vehicle may include an input shaft receiving torque of an engine, an output shaft outputting changed torque of the engine, a first planetary gear set including first, second, and third rotation elements, a second planetary gear set including fourth, fifth, and sixth rotation elements, a third planetary gear set including seventh, eighth, and ninth rotation elements, a fourth planetary gear set including tenth, eleventh, and twelfth rotation elements, a first rotation shaft connecting the first rotation element to the seventh rotation element, a second rotation shaft connected to the second rotation element and directly connected to the input shaft, a third rotation shaft connected to the third rotation element and selectively connected to the first rotation shaft, a fourth rotation shaft connected to the fourth rotation element, selectively connected to the first rotation shaft, and selectively connected to a transmission housing, a fifth rotation shaft connecting the fifth rotation element to the eighth rotation element and selectively connected to the third rotation shaft, a sixth rotation shaft connecting the sixth rotation element to the tenth rotation element and selectively connected to the transmission housing, a seventh rotation shaft connecting the ninth rotation element to the eleventh rotation element and directly connected to the output shaft, and an eighth rotation shaft connected to the twelfth rotation element and selectively connected to the third rotation shaft.

The first planetary gear set may be a single pinion planetary gear set and include a first sun gear as the first rotation element, a first planet carrier as the second rotation element, and a first ring gear as the third rotation element, the second planetary gear set may be a single pinion planetary gear set and include a second sun gear as the fourth rotation element, a second planet carrier as the fifth rotation element, and a second ring gear as the sixth rotation element, the third planetary gear set may be a single pinion planetary gear set and include a third sun gear as the seventh rotation element, a third planet carrier as the eighth rotation element, and a third ring gear as the ninth rotation element, and the fourth planetary gear set may be a single pinion planetary gear set and include a fourth sun gear as the tenth rotation element, a fourth planet carrier as the eleventh rotation element, and a fourth ring gear as the twelfth rotation element.

The planetary gear train may further include a first clutch selectively connecting the first rotation shaft to the third rotation shaft, a second clutch selectively connecting the first rotation shaft to the fourth rotation shaft, a third clutch selectively connecting the third rotation shaft to the fifth rotation shaft, a fourth clutch selectively connecting the third rotation shaft to the eighth rotation shaft, a first brake selectively connecting the sixth rotation shaft to the transmission housing, and a second brake selectively connecting the fourth rotation shaft to the transmission housing.

The first and second clutches and the first brake may be operated at a first forward speed stage, the second and third clutches and the first brake may be operated at a second forward speed stage, the third and fourth clutches and the first brake may be operated at a third forward speed stage, the first and fourth clutches and the first brake may be operated at a fourth forward speed stage, the first, third, and fourth clutches may be operated at a fifth forward speed stage, the first and fourth clutches and the second brake may be operated at a sixth forward speed stage, the third and fourth clutches and the second brake may be operated at a seventh forward speed stage, the second and fourth clutches and the second brake may be operated at an eighth forward speed stage, the second and third clutches and the second brake may be operated at a ninth forward speed stage, and the first clutch and the first and second brakes may be operated at a reverse speed stage.

Various embodiments of the present invention may achieve nine forward speed stages and one reverse speed stage by combining four planetary gear sets with six control elements.

In addition, since gear ratio span greater than 9.0 is secured, driving efficiency of the engine may be maximized.

In addition, since linearity of step ratios is secured, drivability such as acceleration before and after shift, rhythmical engine speed, and so on may be improved.

Further, effects obtained or predicted by the various embodiments of the present invention will be directly or suggestively described in the detailed description section. That is, various effects predicted according to the exemplary embodiment of the present invention will be described in further detail in the detailed description section.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operation chart of control elements at each speed stage in the exemplary planetary gear train according to the present invention.

Figure 1:
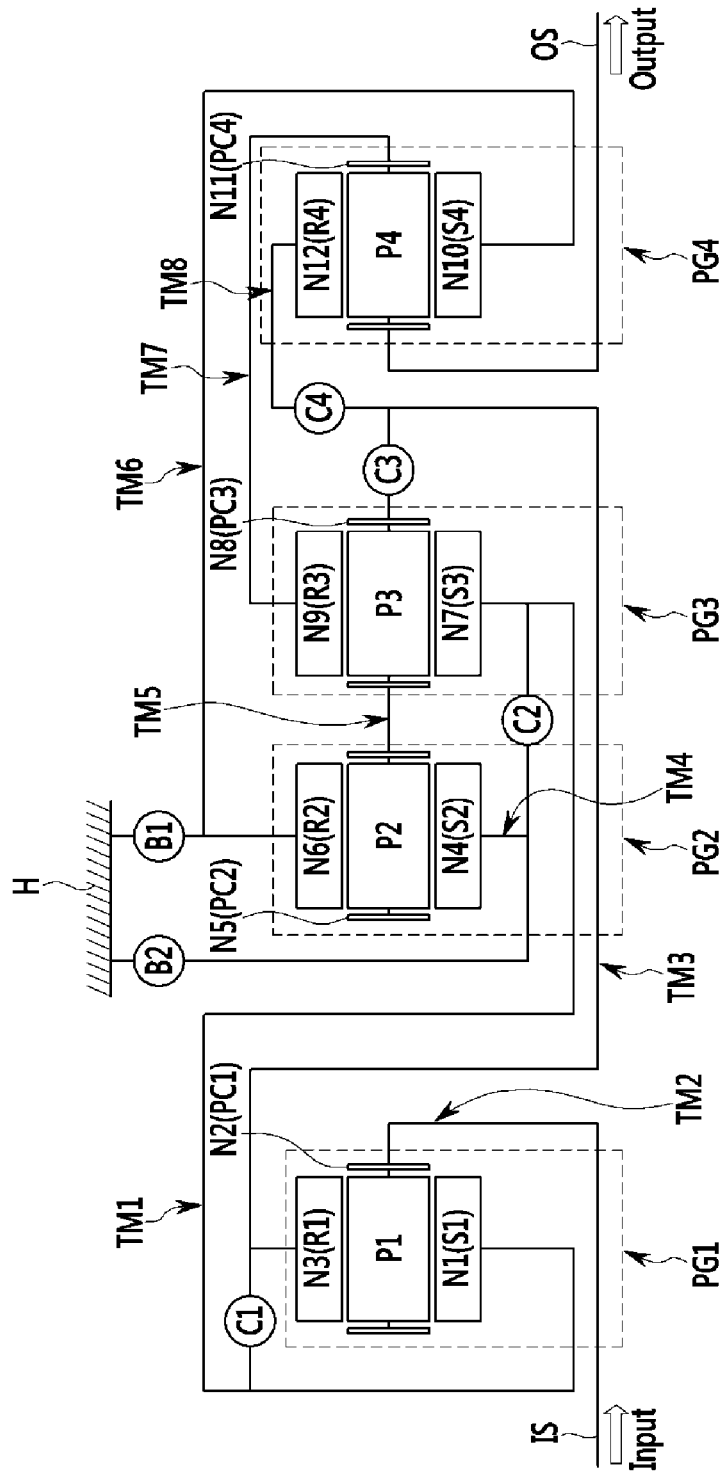
FIG. 1 is a schematic diagram of an exemplary planetary gear train according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

FIG. 1 is a schematic diagram of a planetary gear train according to various embodiments of the present invention.

Referring to FIG. 1, a planetary gear train according to various embodiments of the present invention includes first, second, third, and fourth planetary gear sets PG1, PG2, PG3, and PG4 disposed on the same axis, an input shaft IS, an output shaft OS, eight rotation shafts TM1 to TM8 connected to at least one of rotation elements of the first, second, third, and fourth planetary gear sets PG1, PG2, PG3, and PG4, six control elements C1 to C4, B1, and B2, and a transmission housing H.

As a result, torque input from the input shaft IS is changed by cooperation of the first, second, third, and fourth planetary gear sets PG1, PG2, PG3, and PG4, and the changed torque is output through the output shaft OS.

The simple planetary gear sets are disposed in a sequence of the first, second, third, and fourth planetary gear sets PG1, PG2, PG3, and PG4 from an engine side.

The input shaft IS is an input member and power from a crankshaft of an engine is torque-converted through a torque converter to be input into the input shaft IS.

The output shaft OS is an output member, is disposed in parallel with the input shaft IS, and transmits driving torque to a driving wheel through a differential apparatus.

The first planetary gear set PG1 is a single pinion planetary gear set and includes a first sun gear S1, a first planet carrier PC1 rotatably supporting a first pinion P1 that is externally meshed with the first sun gear S1, and a first ring gear R1 that is internally meshed with the first pinion P1 respectively as first, second, and third rotation elements N1, N2, and N3.

The second planetary gear set PG2 is a single pinion planetary gear set and includes a second sun gear S2, a second planet carrier PC2 rotatably supporting a second pinion P2 that is externally meshed with the second sun gear S2, and a second ring gear R2 that is internally meshed with the second pinion P2 respectively as fourth, fifth, and sixth rotation elements N4, N5, and N6.

The third planetary gear set PG3 is a single pinion planetary gear set and includes a third sun gear S3, a third planet carrier PC3 rotatably supporting a third pinion P3 that is externally meshed with the third sun gear S3, and a third ring gear R3 that is internally meshed with the third pinion P3 respectively as seventh, eighth, and ninth rotation elements N7, N8, and N9.

The fourth planetary gear set PG4 is a single pinion planetary gear set and includes a fourth sun gear S4, a fourth planet carrier PC4 rotatably supporting a fourth pinion P4 that is externally meshed with the fourth sun gear S4, and a fourth ring gear R4 that is internally meshed with the fourth pinion P4 respectively as tenth, eleventh, and twelfth rotation elements N10, N11, and N12.

The first rotation element N1 is directly connected to the seventh rotation element N7, the fifth rotation element N5 is directly connected to the eighth rotation element N8, the sixth rotation element N6 is directly connected to the tenth rotation element N10, and the ninth rotation element N9 is directly connected to the eleventh rotation element N11 such that the first, second, third, and fourth planetary gear sets PG1, PG2, PG3, and PG4 are operated with eight rotation shafts TM1 to TM8.

The eight rotation shafts TM1 to TM8 will be described in further detail.

The first rotation shaft TM1 connects the first sun gear S1 to the third sun gear S3.

The second rotation shaft TM2 is connected to the first planet carrier PC1 and is directly connected to the input shaft IS so as to be continuously operated as an input element.

The third rotation shaft TM3 is connected to the first ring gear R1.

The fourth rotation shaft TM4 is connected to the second sun gear S2, is selectively connected to the first rotation shaft TM1, and is selectively connected to the transmission housing H.

The fifth rotation shaft TM5 connects the second planet carrier PC2 to the third planet carrier PC3 and is selectively connected to the third rotation shaft TM3.

The sixth rotation shaft TM6 connects the second ring gear R2 to the fourth sun gear S4 and is selectively connected to the transmission housing H.

The seventh rotation shaft TM7 connects the third ring gear R3 and the fourth planet carrier PC4 and is directly connected to the output shaft OS so as to be continuously operated as an output element.

The eighth rotation shaft TM8 is connected to the fourth ring gear R4 and is selectively connected to the third rotation shaft TM3.

In addition, four clutches C1, C2, C3, and C4 being control elements are disposed at connection portions between any two rotation shafts among the rotation shafts TM1 to TM8.

In addition, two brakes B1 and B2 being control elements are disposed at connection portions between any one rotation shaft among the rotation shaft TM1 to TM8 and the transmission housing H.

The six control elements C1 to C4, B1, and B2 will be described in further detail.

The first clutch C1 is disposed between the first rotation shaft TM1 and the third rotation shaft TM3 and selectively causes the first rotation shaft TM1 and the third rotation shaft TM3 to integrally rotate with each other.

The second clutch C2 is disposed between the first rotation shaft TM1 and the fourth rotation shaft TM4 and selectively causes the first rotation shaft TM1 and the fourth rotation shaft TM4 to integrally rotate with each other.

The third clutch C3 is disposed between the third rotation shaft TM3 and the fifth rotation shaft TM5 and selectively causes the third rotation shaft TM3 and the fifth rotation shaft TM5 to integrally rotate with each other.

The fourth clutch C4 is disposed between the third rotation shaft TM3 and the eighth rotation shaft TM8 and selectively causes the third rotation shaft TM3 and the eighth rotation shaft TM8 to integrally rotate with each other.

The first brake B1 is disposed between the sixth rotation shaft TM6 and the transmission housing H and causes the sixth rotation shaft TM6 to be operated as a selective fixed element.

The second brake B2 is disposed between the fourth rotation shaft TM4 and the transmission housing H and causes the fourth rotation shaft TM4 to be operated as a selective fixed element.

The control elements including the first, second, third, and fourth clutches C1, C2, C3, and C4 and the first and second brakes B1 and B2 may be multi-plates friction elements of wet type that are operated by hydraulic pressure.

FIG. 2 is an operation chart of control elements at each speed stage in the planetary gear train according to various embodiments of the present invention.

As shown in FIG. 2, three control elements are operated at each speed stage in the planetary gear train according to various embodiments of the present invention.

The first and second clutches C1 and C2 and the first brake B1 are operated at a first forward speed stage D1. In a state that the first rotation shaft TM1 is connected to the third rotation shaft TM3 and the fourth rotation shaft TM4 by operation of the first and second clutches C1 and C2, torque of the input shaft IS is input to the second rotation shaft TM2. In addition, the sixth rotation shaft TM6 is operated as the fixed element by operation of the first brake B1. Therefore, the torque of the input shaft IS is shifted into the first forward speed stage, and the first forward speed stage is output through the seventh rotation shaft TM7.

The second and third clutches C2 and C3 and the first brake B1 are operated at a second forward speed stage D2.

In a state that the first rotation shaft TM1 is connected to the fourth rotation shaft TM4 by operation of the second clutch C2 and the third rotation shaft TM3 is connected to the fifth rotation shaft TM5 by operation of the third clutch C3, the torque of the input shaft IS is input to the second rotation shaft TM2. In addition, the sixth rotation shaft TM6 is operated as the fixed element by operation of the first brake B1. Therefore, the torque of the input shaft IS is shifted into the second forward speed stage, and the second forward speed stage is output through the seventh rotation shaft TM7.

The third and fourth clutches C3 and C4 and the first brake B1 are operated at a third forward speed stage D3. In a state that the third rotation shaft TM3 is connected to the fifth rotation shaft TM5 and the eighth rotation shaft TM8 by operation of the third and fourth clutches C3 and C4, the torque of the input shaft IS is input to the second rotation shaft TM2. In addition, the sixth rotation shaft TM6 is operated as the fixed element by operation of the first brake B1. Therefore, the torque of the input shaft IS is shifted into the third forward speed stage, and the third forward speed stage is output through the seventh rotation shaft TM7.

The first and fourth clutches C1 and C4 and the first brake B1 are operated at a fourth forward speed stage D4. In a state that the first rotation shaft TM1 is connected to the third rotation shaft TM3 by operation of the first clutch C1 and the third rotation shaft TM3 is connected to the eighth rotation shaft TM8 by operation of the fourth clutch C4, the torque of the input shaft IS is input to the second rotation shaft TM2. In addition, the sixth rotation shaft TM6 is operated as the fixed element by operation of the first brake B1. Therefore, the torque of the input shaft IS is shifted into the fourth forward speed stage, and the fourth forward speed stage is output through the seventh rotation shaft TM7.

The first, third, and fourth clutches C1, C3, and C4 are operated at a fifth forward speed stage D5. In a state that the first rotation shaft TM1 is connected to the third rotation shaft TM3 by operation of the first clutch C1, the third rotation shaft TM3 is connected to the fifth rotation shaft TM5 by operation of the third clutch C3, and the third rotation shaft TM3 is connected to the eighth rotation shaft TM8 by operation of the fourth clutch C4 such that the first, second, third, and fourth planetary gear sets PG1, PG2, PG3, and PG4 become lock-up states. Therefore, the torque of the input shaft IS is output through the seventh rotation shaft TM7 without speed change.

The first and fourth clutches C1 and C4 and the second brake B2 are operated at a sixth forward speed stage D6. In a state that the first rotation shaft TM1 is connected to the third rotation shaft TM3 by operation of the first clutch C1 and the third rotation shaft TM3 is connected to the eighth rotation shaft TM8 by operation of the fourth clutch C4, the torque of the input shaft IS is input to the second rotation shaft TM2. In addition, the fourth rotation shaft TM4 is operated as the fixed element by operation of the second brake B2. Therefore, the torque of the input shaft IS is shifted into the sixth forward speed stage, and the sixth forward speed stage is output through the seventh rotation shaft TM7.

The third and fourth clutches C3 and C4 and the second brake B2 are operated at a seventh forward speed stage D7. In a state that the third rotation shaft TM3 is connected to the fifth rotation shaft TM5 and the eighth rotation shaft TM8 by operation of the third and fourth clutches C3 and C4, the torque of the input shaft IS is input to the second rotation shaft TM2. In addition, the fourth rotation shaft TM4 is operated as the fixed element by operation of the second brake B2. Therefore, the torque of the input shaft IS is shifted into the seventh forward speed stage, and the seventh forward speed stage is output through the seventh rotation shaft TM7.

The second and fourth clutches C2 and C4 and the second brake B2 are operated at an eighth forward speed stage D8. In a state that the first rotation shaft TM1 is connected to the fourth rotation shaft TM4 by operation of the second clutch C2 and the third rotation shaft TM3 is connected to the eighth rotation shaft TM8 by operation of the fourth clutch C4, the torque of the input shaft IS is input to the second rotation shaft TM2. In addition, the fourth rotation shaft TM4 is operated as the fixed element by operation of the second brake B2. Therefore, the torque of the input shaft IS is shifted into the eighth forward speed stage, and the eighth forward speed stage is output through the seventh rotation shaft TM7.

The second and third clutches C2 and C3 and the second brake B2 are operated at a ninth forward speed stage D9. In a state that the first rotation shaft TM1 is connected to the fourth rotation shaft TM4 by operation of the second clutch C2 and the third rotation shaft TM3 is connected to the fifth rotation shaft TM5 by operation of the third clutch C3, the torque of the input shaft IS is input to the second rotation shaft TM2. In addition, the fourth rotation shaft TM4 is operated as the fixed element by operation of the second brake B2. Therefore, the torque of the input shaft IS is shifted into the ninth forward speed stage, and the ninth forward speed stage is output through the seventh rotation shaft TM7.

The first clutch C1 and the first and second brakes B1 and B2 are operated at a reverse speed stage REV. In a state that the first rotation shaft TM1 is connected to the third rotation shaft TM3 by operation of the first clutch C1, the torque of the input shaft IS is input to the second rotation shaft TM2. In addition, the sixth rotation shaft TM6 is operated as the fixed element by operation of the first brake B1 and the fourth rotation shaft TM4 is operated as the fixed element by operation of the second brake B2. Therefore, the torque of the input shaft IS is shifted into the reverse speed stage, and the reverse speed stage is output through the seventh rotation shaft TM7.

The planetary gear train according to various embodiments of the present invention may achieve nine forward speed stages and one reverse speed stage by control of four planetary gear sets PG1, PG2, PG3, and PG4, four clutches C1, C2, C3, and C4, and two brakes B1 and B2.

In addition, since step ratios at forward speed stages are larger than or equal to 1.2 or are close to 1.2 and maintain linearity, drivability such as acceleration before and after shift, rhythmical engine speed, and so on may be improved.

In addition, since gear ratio span greater than 9.0 is secured, driving efficiency of the engine may be maximized.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train of an automatic transmission for a vehicle, comprising:
   an input shaft receiving torque of an engine;
   an output shaft configured to output changed torque of the engine;
   a first planetary gear set including first, second, and third rotation elements;
   a second planetary gear set including fourth, fifth, and sixth rotation elements;
   a third planetary gear set including seventh, eighth, and ninth rotation elements; and
   a fourth planetary gear set including tenth, eleventh, and twelfth rotation elements,
   wherein the input shaft is directly connected to the second rotation element,
   the output shaft is directly connected to the eleventh rotation element,
   the first rotation element is directly connected to the seventh rotation element,
   the sixth rotation element is directly connected to the tenth rotation element,
   the fifth rotation element is directly connected to the eighth rotation element,
   the ninth rotation element is directly connected to the eleventh rotation element,
   the first rotation element and the seventh rotation element are selectively connected respectively to the third rotation element and the fourth rotation element,
   the fifth rotation element and the eighth rotation element are selectively connected to the third rotation element,
   the third rotation element is selectively connected to the twelfth rotation element,
   the sixth rotation element and the tenth rotation element are selectively connected to a transmission housing, and
   the fourth rotation element is selectively connected to the transmission housing.

2. The planetary gear train of claim 1, wherein the first, second, and third rotation elements are a first sun gear, a first planet carrier, and a first ring gear,
   the fourth, fifth, and sixth rotation elements are a second sun gear, a second planet carrier, and a second ring gear,
   the seventh, eighth, and ninth rotation elements are a third sun gear, a third planet carrier, and a third ring gear, and
   the tenth, eleventh, and twelfth rotation elements are a fourth sun gear, a fourth planet carrier, and a fourth ring gear.

3. The planetary gear train of claim 2, wherein each of the first, second, third, and fourth planetary gear sets comprises a single pinion planetary gear set.

4. The planetary gear train of claim 1, further comprising:
   a first clutch selectively connecting the first rotation element and the seventh rotation element to the third rotation element;
   a second clutch selectively connecting the first rotation element and the seventh rotation element to the fourth rotation element;
   a third clutch selectively connecting the fifth rotation element and the eighth rotation element to the third rotation element;
   a fourth clutch selectively connecting the third rotation element to the twelfth rotation element;
   a first brake selectively connecting the sixth rotation element and the tenth rotation element to the transmission housing; and
   a second brake selectively connecting the fourth rotation element to the transmission housing.

5. A planetary gear train of an automatic transmission for a vehicle, comprising:
   an input shaft receiving torque of an engine;
   an output shaft outputting changed torque of the engine;
   a first planetary gear set including first, second, and third rotation elements;
   a second planetary gear set including fourth, fifth, and sixth rotation elements;
   a third planetary gear set including seventh, eighth, and ninth rotation elements;
   a fourth planetary gear set including tenth, eleventh, and twelfth rotation elements;
   a first rotation shaft connecting the first rotation element to the seventh rotation element;
   a second rotation shaft connected to the second rotation element and directly connected to the input shaft;
   a third rotation shaft connected to the third rotation element and selectively connected to the first rotation shaft;
   a fourth rotation shaft connected to the fourth rotation element, selectively connected to the first rotation shaft, and selectively connected to a transmission housing;
   a fifth rotation shaft connecting the fifth rotation element to the eighth rotation element and selectively connected to the third rotation shaft;
   a sixth rotation shaft connecting the sixth rotation element to the tenth rotation element and selectively connected to the transmission housing;
   a seventh rotation shaft connecting the ninth rotation element to the eleventh rotation element and directly connected to the output shaft; and
   an eighth rotation shaft connected to the twelfth rotation element and selectively connected to the third rotation shaft.

6. The planetary gear train of claim 5, wherein the first planetary gear set comprises a single pinion planetary gear set and includes a first sun gear as the first rotation element, a first planet carrier as the second rotation element, and a first ring gear as the third rotation element,
   the second planetary gear set comprises a single pinion planetary gear set and includes a second sun gear as the fourth rotation element, a second planet carrier as the fifth rotation element, and a second ring gear as the sixth rotation element,
   the third planetary gear set comprises a single pinion planetary gear set and includes a third sun gear as the seventh rotation element, a third planet carrier as the eighth rotation element, and a third ring gear as the ninth rotation element, and
   the fourth planetary gear set comprises a single pinion planetary gear set and includes a fourth sun gear as the tenth rotation element, a fourth planet carrier as the eleventh rotation element, and a fourth ring gear as the twelfth rotation element.

7. The planetary gear train of claim 5, further comprising:
   a first clutch selectively connecting the first rotation shaft to the third rotation shaft;
   a second clutch selectively connecting the first rotation shaft to the fourth rotation shaft;
   a third clutch selectively connecting the third rotation shaft to the fifth rotation shaft;
   a fourth clutch selectively connecting the third rotation shaft to the eighth rotation shaft;
   a first brake selectively connecting the sixth rotation shaft to the transmission housing; and a second brake selectively connecting the fourth rotation shaft to the transmission housing.

8. The planetary gear train of claim 7, wherein the first and second clutches and the first brake are operated at a first forward speed stage, the second and third clutches and the first brake are operated at a second forward speed stage, the third and fourth clutches and the first brake are operated at a third forward speed stage, the first and fourth clutches and the first brake are operated at a fourth forward speed stage, the first, third, and fourth clutches are operated at a fifth forward speed stage, the first and fourth clutches and the second brake are operated at a sixth forward speed stage, the third and fourth clutches and the second brake are operated at a seventh forward speed stage, the second and fourth clutches and the second brake are operated at an eighth forward speed stage, the second and third clutches and the second brake are operated at a ninth forward speed stage, and the first clutch and the first and second brakes are operated at a reverse speed stage.

\* \* \* \* \*